United States Patent Office 3,336,291
Patented Aug. 15, 1967

3,336,291
OXYALKYLENE CONDENSATES OF CELLULOSE USEFUL IN THE PREPARATION OF URETHANES
John T. Patton, Jr., Wyandotte, Mich., and Henry E. Reich, Wilmette, Ill., assignors to Wyandotte Chemicals Corporation, Wyandotte, Mich., a corporation of Michigan
No Drawing. Filed Oct. 7, 1963, Ser. No. 314,480
15 Claims. (Cl. 260—231)

This invention relates to oxyalkylene condensates of cellulose and to polyurethane compositions produced by the reaction of polyisocyanates with these oxyalkylene condensates of cellulose. The polyurethane resin producing reaction may take place in the presence of water or other blowing agent to produce polyurethane foams.

Due to the physical properties of cellulose, it is difficult to react alkylene oxides therewith to produce oxyalkylene condensates of cellulose. While various methods have been proposed for the reaction of alkylene oxides with cellulose, the prior art methods generally require a considerable amount of a suitable reaction medium or solvent which necessitates a solvent recovery step in order to obtain as low a production cost as possible for the oxyalkylated cellulose product. Further, in practicing the prior art methods less than about 20 mols and in most instances less than 3 mols of alkylene oxide are added per mol of cellulose. The products obtained from such reactions are cellulose-like in appearance and are in substantially the same physical state or particulate form as the cellulose used as the starting material.

Accordingly, it is a purpose of this invention to react a large number of units of alkylene oxide per glucose unit of cellulose to obtain oxyalkylene condensates of cellulose in a fluid, i.e. a liquid or paste form, and particularly to produce a high molecular weight product, i.e. a product having a large number of oxyalkylene groups per glucose unit of the cellulose and to produce such products without the necessity of recovering solvent from the final product.

The process of this invention may be employed for the synthesis of homopolymers or heteric or block copolymers from alkylene oxides and cellulose. In general, the oxyalkylene condensates of cellulose produced in accordance with this invention vary in form from liquid to a thick paste and in solubility from complete water solubility to complete hydrocarbon solubility and the products do not have the particulate form characteristic of cellulose itself. These products are useful as detergents or as components of detergent compositions and in the preparation of resins such as urethanes and particularly in urethane foam formulations.

In accordance with this invention, oxyalkylene condensates of cellulose are prepared by reacting at least one alkylene oxide with cellulosic material in the presence of at least one high molecular weight polyoxyalkylene alcohol derivative.

It should be noted that where the term "molecular weight" is stated with respect to the oxyalkylene condensates of cellulose of this invention in this specification and claims, unless otherwise noted, there is meant the average theoretical molecular weight of the oxyalkylene groups, other than oxyethylene groups, per glucose unit of the cellulose. More specifically, this average theoretical molecular weight equals the total of the grams of alkylene oxide, other than ethylene oxide, employed per glucose unit of the cellulosic material. Highly useful compositions may be prepared which contain chains of oxyethylene groups attached to chains of oxyalkylene groups other than oxyethylene groups, such as oxypropylene groups, oxybutylene groups, etc. Such compounds are prepared by reacting at least one alkylene oxide, other than ethylene oxide, with cellulosic material, followed by reacting the product with ethylene oxide, both reactions taking place in the presence of at least one high molecular weight polyoxyalkylene derivative of aliphatic and heterocyclic alcohols. It is preferred to define such products containing oxyethylene groups in terms of the theoretical molecular weight of the oxyalkylene groups, other than oxyethylene groups and the weight percent of oxyethylene groups in the completed molecule and accordingly they are so defined herein.

It is well recognized in the field of alkylene oxide chemistry that the polyoxyalkylene compositions obtained by condensing alkylene oxides with other materials are actually mixtures of compounds rather than a singular molecular compound. The mixture contains closely related homologues wherein the statistical average number of oxyalkylene groups equals the number of mols of alkylene oxide employed and the individual members of the mixture contain varying numbers of oxyalkylene groups. Thus the compositions of this invention are mixtures of compounds which are defined respectively by the theoretical molecular weight of the polyoxyalkylene chains other than oxyethylene chains per glucose unit of the cellulosic material and where the product contains oxyethylene chains the weight percent of the oxyethylene chains based on the weight of the total molecule is also included.

The polyoxyalkylene alcohol derivatives employed as a reaction medium or solvent in accordance with this invention are also mixtures of closely related homologues. By the term "molecular weight" as applied to these polyoxyalkylene derivatives of alcohols is meant the average theoretical molecular weight of the molecule. This equals the total grams of the alkylene oxide and alcohol per mol of alcohol involved in producing this derivative. A molecular weight of at least about 1000 per hydroxyl group of such derivative is preferred. While there is no upper limit to the molecular weight, a suitable maximum for normal practice is about 100,000 per hydroxyl group.

It is preferred to prepare the oxyalkylene condensates of cellulose by mixing the cellulosic material with an alkali such as sodium or potassium hydroxide which acts as a catalyst, water and at least one high molecular weight polyoxyalkylene alcohol derivative. The alkylene oxide is reacted with the cellulosic material in the presence of the alkali, water and the polyoxyalkylene alcohol derivative by gradually adding the alkylene oxide to the mixture of alkali, water and polyoxyalkylene alcohol derivative.

The cellulosic material may be any appropriate celluloic raw material of the type conventionaly used in chemical reactions such as chemical cotton, cotton linters, or mechanically pulverized wood pulp cellulose. The cellulosic material may be bulk dried, sheet dried, pretreated with alkali, or otherwise prepared for reduction to particles sufficiently small to permit reaction thereon by the reactants. The cellulosic material may be ground in an attrition mill or similar device to fine particles, or it may be shredded, fluffed, or otherwise treated.

Any alkylene oxide may be employed, for example: ethylene oxide, propylene oxide, 1,2-butylene oxide, 2,3-butylene oxide, butadiene monoxide, cyclohexane oxide, glycidyl ethers such as methyl glycidyl ether, allyl glycidyl ether and phenyl glycidyl ether, the epoxypentanes, epoxyheptanes, styrene oxide and the like, and any combination of 2 or more alkylene oxides may also be used.

Any polyoxyalkylene alcohol derivative may be employed as a reaction medium or solvent. These include derivatives obtained by the reaction of any of the above alkylene oxides with any monofunctional or polyfunctional alcohol. Examples of polyoxyalkylene derivatives of these alcohols include polyoxypropylene glycols commonly referred to as polypropylene glycols, polyoxybutylene glycols, polyoxypropylated pentaerythritol, sorbitol and anhydroenneaheptitol, also known as 3,3,5,5-tetrakis-(hydroxymethyl)-3-pyranol, α-methyl glycoside, polyoxypropylene derivatives of trimethylolpropane, glycerine, polyoxyalkylene alcohol derivatives such as those described in U.S. Patent 2,425,845 and oxyalkylene condensates of cellulose having a molecular weight lower than desired for the final product. The original mixture of cellulosic material, alkali, water and polyoxyalkylene alcohol derivative contains from about 5 to 25 percent by weight of the cellulosic material, from about 5 to 25 percent by weight of aqueous alkali solution which contains from about 25 to 75 percent by weight of an alkali metal hydroxide and from about 75 to 25 percent by weight of the polyoxyalkylene alcohol derivative. At least about 40 mols and preferably from about 40 to 4000 mols of alkylene oxide per glucose unit of cellulosic material are added to the above mixture.

The cellulosic material, alkali, water and the polyoxyalkylene alcohol derivative are charged into a pressure vessel such as an autoclave generally at ambient temperature and pressure and the mixture heated to a temperature of from about 50 to 80° C. The alkylene oxide is then gradually added to the material in the pressure vessel. The pressure and temperature are gradually increased as the material is added to a pressure preferably from about 65 to 150 p.s.i.g. and a temperature preferably from about 125 to 160° C. For practical purposes generally the pressure will not exceed 500 p.s.i.g. and the temperature will not exceed 200° C. After completion of addition, the material may be maintained at said maximum temperature and pressure for a period of from about 0.5 to 1.5 hours to complete the reaction. The product is then cooled and the material removed from the pressure vessel.

Due to reactor size limitations it may be necessary to prepare very high molecular weight oxyalkylated cellulose products by step-wise reactions. More specifically, to effectively carry out the reaction in any reactor, a certain minimum amount of the starting materials, i.e. cellulosic material, alkali and high molecular weight polyoxyalkylene alcohol derivative is required. Often, as a result of the addition of the alkylene oxide the reactor will be filled to its maximum level before the amount of alkylene oxide necessary to obtain the desired high molecular weight product has been added. Accordingly, to prepare such high molecular weight oxyalkylated cellulosic products stepwise additions may be employed. In such case, an intermediate product is produced by the reaction of the alkylene oxide with the cellulosic material which product is an oxyalkylene condensate of the cellulose which has a lower molecular weight per glucose unit of the cellulose than desired. Accordingly, a portion of this material may be removed from the reactor and further alkylene oxide added to the reactor. In order to facilitate accurate determination of the amount of material actually produced in view of the fact that errors in the amounts added may have been made which are not apparent when a closed reactor is employed, it is often desirable to discharge the material, clean out the reactor and then add a portion of the first material produced to the reactor followed by addition of the same or a different alkylene oxide. If a product having the desired molecular weight per unit of glucose in the cellulose is still not obtained, these steps may be repeated as many times as necessary to obtain the desired high molecular weight. In commercial operations, the initial reactor may be followed up by either a large reactor or a plurality of reactors whereby the first material having the lower molecular weight per unit of glucose in the cellulose from the first reactor is transferred to a larger reactor or into several reactors for further reaction with alkylene oxide, and the initial reactor used to produce more of the initial lower molecular weight oxyalkylene condensate of cellulose. Thus, it can be seen that high molecular weight materials may be produced by sequential or step-wise reactions as above described which may be necessary or desirable due to the physical size limitations of the equipment.

For most applications of the product of this invention, it is desirable to neutralize the residual alkali with a suitable acid such as phosphoric and to remove volatile impurities by stripping at reduced pressure. Filtration through an inert particulate medium such as diatomaceous earth may also be desirable in some instances.

The reaction products of this invention are homogeneous hydroxyl containing materials. These may be used alone for reaction with polyfunctional isocyanates to produce polyurethanes or in admixture with other compounds which react with polyisocyanates such as hydroxyl containing ethers, polyethers and polyesters. Any polyfunctional isocyanate such as toluene diisocyanate (pure or mixed isomers), hexamethylene diisocyanate, 1,5-naphthalene diisocyanate, methylene-bis-4-phenyl isocyanate, polymethylene polyphenyl isocyanate, etc. will react with the polyoxyalkylene condensates of cellulose of this invention. The preferred isocyanates are the various commercial isocyanates because of their availability and desirable physical properties which are well understood by the art. Various polyurethane products may be prepared by both the prepolymer and one-shot methods from the oxyalkylene condensates of cellulose of this invention including elastomers and foams.

It will be understood that the production of the polyurethane foam may be accomplished in various ways known to the art. In this regard, reference is made to the texts entitled Polyurethanes by Bernard A. Dombrow, published by Reinhold Publishing Corporation, New York, N.Y., 1957, and Polyurethanes Chemistry and Technology by J. H. Saunders and K. C. Frisch, published by Interscience Publishers, New York-London, where reference is made to various techniques for the production of polyurethane foams, including the "one-shot" procedure as well as various procedures including polyurethane prepolymers. To prepare polyurethane foams, the composition would include a blowing agent as is conventional. The term "blowing agent" includes various types of materials which are known to possess an expanding function. Thus, water reacts with isocyanate to produce in situ carbon dioxide gas, which serves as a blowing agent, and an amine which enters into the polymerization reaction. Blowing agents which expand or decompose to yield gaseous products normally upon increase in temperature may also be used. These agents which generally do not enter into the isocyanate polymerization reaction are illustrated by the materials generally known as "Freons" which are lower molecular weight hydrocarbons usually containing both chlorine and fluorine substituents. Other blowing agents are illustrated by sodium and ammonium bicarbonate, etc.

As is generally accepted in the urethane art when preparing a foam, the equivalents of isocyanates are preferably approximately equal to the equivalents of hydroxyls (or other radicals providing active hydrogen) designed to react with polyisocyanate to produce the urethane polymer. The ratio of isocyanate to hydroxyl can vary considerably in accordance with the invention in the same manner as is known for the conventional hydroxyl containing materials known to the art.

The product of this invention may also be employed for detergent applications or as surface active agents or in admixture with prior art detergents or surface active agents. Since the polyoxyalkylene derivatives described above which is employed as the reaction medium either takes part in the reaction or complements the action of the resulting cellulose polyol for purposes such as detergency, preparation of urethanes, etc., there is no need to separate the polyoxyalkylene derivative employed as a reaction medium from the resulting product. The reaction products generally contain substantially more than 20 mols of alkylene oxide per mol of cellulose and have a consistency or form ranging from a liquid to a heavy pasty material.

It is known as taught, for example, in U.S. Patent No. 2,572,039 to react alkylene oxides with cellulose. However, this patent does not specifically disclose reacting more than about 20 mols of alkylene oxide per mol of cellulose and the resulting product rather than being a liquid or paste-type material is a product having a particulate form very similar to the original cellulose. The product produce by the method of this invention is entirely different from the product of the patent since it bears no resemblance whatsoever to the original cellulose material but in fact is in a fluid form ranging from a liquid to a heavy paste. The product of the instant invention is particularly suitable for the preparation of polyurethanes and as a surface active agent whereas the product produced by the method of the patent cannot be used for such purposes.

The product of this invention is produced by an entirely different method from that of the patentee since the patent discloses reaction in the presence of secondary three-carbon and secondary tertiary four- and five-carbon aliphatic alcohols and mixtures thereof whereas the reaction of the instant invention is carried out in the presence of a polyoxyalkylene derivative of an alcohol. If the alcohols disclosed in the patent were employed as a reaction medium for the reaction of the instant invention, it would be necessary to remove the alcohol from the final product by a means such as distillation whereas this is not necessary when the product is produced by the method of the instant invention.

The following examples set forth various ways in which the principle of the invention is practiced.

EXAMPLE I

Part A 82 grams of mechanically pulverized wood pulp cellulose, 40 grams of sodium hydroxide as a 50% aqueous solution and 550 grams of a polypropylene glycol having a theoretical molecular weight of 4800 are charged into a clean one-gallon stainless steel autoclave which is provided with a mechanical agitator that is operated throughout the reaction. This reactor or autoclave is then sealed, purged with nitrogen and pressure tested at 80–90 p.s.i.g. for 5 minutes with the agitator in operation. If the system is tight, the system is vented to zero and then heated to about 50° C. Next, 1800 grams of propylene oxide feed is added over a period of 8 hours. After one hour of operation, the reaction temperature is gradually increased to about 120° C. The pressure gradually increases to a final pressure of 75 p.s.i.g. After completion of the oxide addition, the reaction mixture is stirred at 120° C. for 60 minutes. The material is then cooled to 50° C. and discharged. The product is a polyoxypropylene condensate of cellulose having a theoretical molecular weight of 3764 per glucose unit of the cellulose.

Part B 1025 grams of the crude unneutralized cellulose condensate produced above is charged into the above-described autoclave at a temperature of 25° C., and the system is purged as described above. The material in the autoclave is agitated throughout the process. The autoclave is heated to 125° C., the pressure is adjusted to zero p.s.i.g., and the propylene oxide feed is initiated. 1600 grams of propylene oxide is added over a period of about 6 hours with the final temperature and pressure being 125° C. and 90 p.s.i.g. After completion of the oxide addition, the reaction mixture is stirred for 60 minutes at 125° C. The product is cooled to 50° C. and discharged.

The residual sodium hydroxide is neutralized with phosphoric acid and the remaining volatile materials are removed by stripping at reduced pressure. The product is then filtered through a bed of particles of diatomaceous earth. The product is a polyoxypropylene condensate of cellulose which is a viscous, amber liquid having a theoretical molecular weight of 12,000 per glucose unit of the cellulose.

EXAMPLE II

Part A

A polyoxypropylene condensate of cellulose having a theoretical molecular weight of 4450 per glucose unit of the cellulose is prepared by a method substantially as described in Part A of Example I with the exception that 56 grams of potassium hydroxide as a 50% aqueous solution is substituted for the 40 grams of 50% aqueous sodium hydroxide solution.

Part B 500 grams of the crude unneutralized cellulose condensate produced in Part A is reacted with 2000 grams of propylene oxide wherein the propylene oxide is added over a period of 10 hours, all in a manner substantially the same as set forth in Part B of Example I. The residual potassium hydroxide of the crude product is neutralized with phosphoric acid and the volatile materials are removed by stripping under reduced pressure. The product is then filtered through a bed of particles of diatomaceous earth. The product is a polyoxypropylene condensate of cellulose which is a viscous, amber liquid having a theoretical molecular weight of 22,200 per glucose unit of the cellulose.

EXAMPLE III

Part A

A polyoxypropylene condensate of cellulose having a theoretical molecular weight of 3764 per glucose unit of the cellulose is prepared by a method substantially the same as that set forth in Part A of Example I with the exception that cellulose pulp made by the Kraft sulfate process was substituted for the cellulosic material of Part A, 80 rather than 40 grams of 50% aqueous sodium hydroxide solution was employed, and a polypropylene glycol having a theoretical molecular weight of 6500 was employed in lieu of one having a theoretical molecular weight of 4800.

Part B 488 grams of crude unneutralized cellulose condensate of Part A is reacted with 2124 grams of propylene oxide wherein the propylene oxide is added over a period of 8 hours, all in a manner substantially the same as that described in Part B of Example I. The residual sodium hydroxide of the crude product is neutralized with phosphoric acid and the volatile materials are removed by stripping under reduced pressure. The product is then filtered through a bed of particles of diatomaceous earth. The product is a polyoxypropylene condensate of cellulose which is a viscous, amber liquid having a theoretical molecular weight of 25,000 per glucose unit of the cellulose.

EXAMPLE IV

Part A

A polyoxypropylene condensate of cellulose which is a viscous, amber liquid having a theoretical molecular weight of 3764 per glucose unit of the cellulose is prepared by a method substantially the same as that set forth in Part A of Example I with the exception that 550 grams of a propylene oxide condensate with pentaerythritol having a theoretical molecular weight of 4000 is employed in lieu of the propylene glycol.

Part B 1025 grams of crude unneutralized polyoxypropylene condensate of cellulose of Part A is reacted with 1600 grams of propylene oxide, all in a manner substantially the same as that described in Part B of Example I. The residual sodium hydroxide of the crude product is neutralized with phosphoric acid and the volatile materials are removed by stripping under reduced pressure. The product is then filtered through a bed of particles of diatomaceous earth. The product is a polyoxypropylene condensate of cellulose which is a viscous, amber liquid having a theoretical molecular weight of 12,000 per glucose unit of the cellulose.

EXAMPLE V

Part A

A polyoxybutylene condensate of cellulose having a theoretical molecular weight of 4000 per glucose unit of the cellulose is prepared by a method substantially the same as that set forth in Part A of Example I with the exception that 550 grams of a propylene oxide condensate with pentaerythritol having a theoretical molecular weight of 4000 is employed in lieu of the propylene glycol, and 1918 grams of 1,2-butylene oxide feed is substituted for the propylene oxide feed.

Part B 957 grams of the crude unneutralized polyoxybutylene condensate of cellulose of Part A is reacted with 1480 grams of 1,2-butylene oxide, all in a manner substantially the same as that described in Part B of Example I. The residual sodium hydroxide of the crude product is neutralized with phosphoric acid and the volatile materials are removed by stripping under reduced pressure. The product is then filtered through a bed of particles of diatomaceous earth. The product is a polyoxybutylene condensate of cellulose which is a viscous, amber liquid having a theoretical molecular weight of 12,000 per glucose unit of the cellulose.

EXAMPLE VI

Part A

A polyoxybutylene condensate of cellulose which is a viscous, amber liquid having a theoretical molecular weight of 4000 per glucose unit of the cellulose is prepared by a method substantially the same as that set forth in Part A of Example I with the exception that 550 grams of a 1,2-butylene oxide condensate with trimethylolpropane having a theoretical molecular weight of 6000 is employed in lieu of the propylene glycol and 1918 grams of 1,2-butylene oxide feed is substituted for the propylene oxide feed.

Part B 957 grams of the crude unneutralized polyoxybutylene condensate of cellulose of Part A is reacted with 1480 grams of 1,2-butylene oxide, all in a manner substantially the same as that described in Part B of Example I. The residual sodium hydroxide of the crude product is neutralized with phosphoric acid and the volatile materials are removed by stripping under reduced pressure. The product is then filtered through a bed of particles of diatomaceous earth. The product is a polyoxybutylene condensate of cellulose which is a viscous, amber liquid having a theoretical molecular weight of 12,000 per glucose unit of the cellulose.

EXAMPLE VII

Part A

A polyoxybutylene condensate of cellulose which is a viscous, amber liquid having a theoretical molecular weight of 4000 per glucose unit of the cellulose is prepared by a method substantially the same as that set forth in Part A of Example I. with the exception that 550 grams of a propylene oxide condensate with anhydroenneaheptitol having a theoretical molecular weight of the oxypropylene units of 4000 is employed in lieu of the propylene glycol and 1918 grams of 1,2-butylene oxide feed is substituted for the propylene oxide feed.

Part B 957 grams of the crude unneutralized polyoxybutylene condensate of cellulose is reacted with 1480 grams of 1,2-butylene oxide, all in a manner substantially the same as that described in Part B of Example I. The residual sodium hydroxide of the crude product is neutralized with phosphoric acid and the volatile materials are removed by stripping under reduced pressure. The product is then filtered through a bed of particles of diatomaceous earth. The product is a polyoxybutylene condensate of cellulose which is viscous, amber liquid having a theoretical molecular weight of 12,000 per glucose unit of the cellulose.

EXAMPLE VIII

Part A

A polyoxypropylene condensate of cellulose having a theoretical molecular weight of 3764 per glucose unit of the cellulose is prepared by a method substantially the same as that set forth in Part of Example I with the exception that the propylene oxide feed is added over a period of 10 hours rather than 8 hours.

Part B 500 grams of the crude unneutralized cellulose condensate of Part A is reacted with 2200 grams of propylene oxide which is added over a period of 9 hours in the manner substantially as described in Part B of Example I. The material produced is cooled to 30° C. and discharged. The product is a polyoxypropylene condensate of cellulose having a theoretical molecular weight of 20,400 per glucose unit of the cellulose.

Part C 1200 grams of the crude unneutralized cellulose condensate produced in Part B is reacted with 975 grams of ethylene oxide which is added over a period of 4 hours, all in a manner substantially as described in Part B of Example I. The product is cooled to 50° C. and discharged. Residual sodium hydroxide is neutralized with phosphoric acid and the remaining volatile materials are removed by stripping under reduced pressure. The product is then filtered through a bed of particles of diatomaceous earth. The product is a polyoxypropylene, polyoxyethylene condensate of cellulose which is a viscous, amber liquid having a theoretical molecular weight of 20,400 per glucose unit of the cellulose and a weight percent of oxyethylene groups based on the total weight of the product of 45 percent.

EXAMPLE IX

Part A

Three polyoxypropylene condensates of cellulose, each having a theoretical molecular weight of 3764 per glucose unit of the cellulose, are prepared by a method substantially the same as that set forth in Part A of Example I with the exception that all three products employ a different quantity of sodium hydroxide from that in Example I, the propylene oxide is added over a 10-hour period and each of the three products is prepared from a different cellulosic material. One product is prepared from mechanically pulverized wood pulp cellulose as in Example I, while another is prepared from cotton linters. In preparing these two products, 80 grams of 50% aqueous sodium hydroxide solution are employed rather than 40 grams of 50% aqueous sodium hydroxide solution as in Example I. The third product is prepared from alkali cellulose which consists of 45% cellulose (10 parts soft Kraft pulp made by the sulfate process and 1 part mechanically pulverized cellulose pulp), 35% water and 20% soduim hydroxide. The material is prepared by steeping the cellulosic material with 36% sodium hydroxide solution. The sodium hydroxide present in this alkali cellulose serves the purpose of the 50% sodium hydroxide solution of Example I.

Part B 488 grams of each of the crude unneutralized cellulose condensates produced in Part A is reacted with 2124 grams of propylene oxide wherein the propylene oxide is added over a period of 8 hours, all in a manner substantially the same as that described in Part B of Example I. The product is a polyoxypropylene condensate of cellulose having a theoretical molecular weight of 25,000 per glucose unit of the cellulose.

Part C 850-gram portions of each of the crude unneutralized polyoxypropylene condensates of cellulose produced in Part B above are reacted with 1700 grams of ethylene oxide, the ethylene oxide being added over a period of about 7 hours, all in a manner substantially as described in Part B of Example I. The residual sodium hydroxide of the crude product is neutralized with phosphoric acid and the remaining volatile materials removed by stripping at reduced pressure. Each product is then filtered through a bed of diatomaceous earth. These products are polyoxypropylene, polyoxyethylene condensates of cellulose which are light-colored liquids having a theoretical molecular weight of 25,000 per glucose unit of the cellulose and a weight percent of oxyethylene groups based on the total weight of the product of 67%.

Part D

A 1400-gram portion of the crude unneutralized polyoxypropylene condensate of cellulose obtained in Part B wherein the original cellulosic material is mechanically pulverized wood pulp is reacted with 1400 grams of propylene oxide wherein the propylene oxide is added over a period of 6 hours, all in the manner substantially as described for Part B of Example I. The product is a polyoxypropylene condensate of cellulose which is a light-colored liquid having a theoretical molecular weight of 50,000 per glucose unit of the cellulose.

600 grams of this crude unneutralized polyoxypropylene condensate of cellulose is reacted with 1400 grams of ethylene oxide, the ethylene oxide being added over a period of about 7 hours, all in the manner substantially as described in Part B of Example I. The residual sodium hydroxide of the crude product is neutralized with phosphoric acid and the remaining volatile materials are removed by stripping at reduced pressure. The product is then filtered through a bed of particles of diatomaceous earth. The final product is a polyoxypropylene, polyoxyethylene condensate of cellulose which is a light-colored liquid having a theoretical molecular weight of 50,000 per glucose unit of cellulose and a weight percent of oxyethylene groups based on the total weight of the product of 70%.

EXAMPLE X

Two typical one-shot foaming compositions are prepared using the product obtained in Example I. Each foaming composition is prepared by mixing 100 grams of the product of Example I, 0.7 gram of a dimethyl silicone emulsification surface active agent or wetting agent; 3.0 gram of water; 0.15 gram of triethylene diamine; 0.5 gram of N-ethyl morpholine; 0.5 gram of stabilized stannous octoate, and 42.2 grams for one composition and 40.8 grams for the other composition of an 80/20 mixture of the 2,4 and 2,6 isomers of tolylene diisocyanate. Foams are prepared in the conventional manner from these compositions which are high modulus flexible foams.

EXAMPLE XI

A typical prepolymer for a polyurethane foaming composition is prepared by mixing 739 grams of 2,4-toluene diisocyanate and 500 grams of the product of Example I in a flask. Heat is applied wherein the temperature is gradually increased from 26° C. to 105° C. over a period of 1 hour and 45 minutes.

Three foaming compositions are prepared from the above prepolymer and the components shown in the table below. The amounts shown in the table are in grams.

TABLE I

| Components | Composition No. 1 | Composition No. 2 | Composition No. 3 |
|---|---|---|---|
| Prepolymer | 100 | 100 | 100 |
| Emulsification Surfactant (Same as Example X) | 0.5 | 0.5 | 0.5 |
| Stabilized Stannous Octoate | 0.25 | 0.25 | 0.25 |
| Product of Example I | 466.8 | | |
| Dipropylene Glycol | | 38.6 | |
| Ethylene Glycol | | | 19.3 |
| N-Ethyl Morpholine | 0.5 | 0.5 | 0.5 |
| Water | 3.0 | 3.0 | 3.0 |
| Triethylenediamine | 0.15 | 0.15 | 0.15 |

Foams are produced in the conventional manner from the compositions set forth above. Composition No. 1 produces a high modulus flexible foam and Compositions No. 2 and No. 3 produce a rigid foam.

EXAMPLE XII

A plurality of typical one-shot foaming compositions are prepared using the product of Example III. These compositions are prepared by mixing the amounts, in grams, of the components as shown in Table II below. The component indicated as Polymer A in Table II below is a polyoxypropylene derivative of trimethylolpropane having an average molecular weight of 4100. The component indicated as Polymer B in Table II below is a propylene oxide adduct of trimethylolpropane terminated with ethylene oxide having an average molecular weight of 4500. Both products are sold by the Wyandotte Chemicals Corporation under the trademark Pluracol. Polymer A is identified as Pluracol TP–4040 while Polymer B is identified as Pluracol TPE–4542.

TABLE II

| Components | 1 | 2 | 3 | 4 | 5 | 6 | 7 | 8 | 9 | 10 | 11 | 12 |
|---|---|---|---|---|---|---|---|---|---|---|---|---|
| Product of Example III | 100 | 15 | 20 | 15 | 20 | 25 | 10 | 25 | 25 | 20 | 15 | 10 |
| Polymer A | | 85 | 80 | | | | | 75 | | | | |
| Polymer B | | | | 85 | 80 | 75 | 90 | | 75 | 80 | 85 | 90 |
| Emulsification Surfactant (Same as Example X) | 0.7 | 0.5 | 0.5 | 0.5 | 0.5 | 0.5 | 0.5 | 0.5 | 0.5 | 0.5 | 0.5 | 0.5 |
| Stabilized Stannous Octoate | 0.5 | 0.5 | 0.5 | 0.5 | 0.5 | 0.5 | 0.5 | 0.5 | 0.2 | 0.2 | 0.2 | 0.2 |
| N-Ethyl Morpholine | 0.5 | 0.5 | 0.5 | 0.5 | 0.5 | 0.5 | 0.5 | 0.5 | | | | |
| Triethylene-diamine | 0.15 | 0.15 | 0.15 | 0.15 | 0.15 | 0.15 | 0.15 | 0.15 | 0.25 | 0.25 | 0.25 | 0.25 |
| Water | 3.0 | 3.3 | 3.3 | 3.3 | 3.3 | 3.3 | 3.3 | 3.3 | 3.3 | 3.3 | 3.3 | 3.3 |
| Toluene Diisocyanate (80/20 mixture of 2,4 and 2,6 isomers) | 40.1 | 40.5 | 40.6 | 40.1 | 40.3 | 40.5 | 39.9 | 40.8 | 40.5 | 40.3 | 40.1 | 39.9 |

Foams are produced in the conventional manner from the compositions set forth above. Composition No. 1 produces a high modulus flexible foam while the remaining compositions produce comparatively soft flexible foams.

While there has been shown and described hereinabove the preferred embodiments of this invention, it is to be understood that various changes, alterations and modifications can be made thereto without departing from the spirit and scope thereof as defined in the appended claims.

What is claimed is:

1. The polyoxyalkylene condensates of cellulose comprising the reaction product of at least one alkylene oxide selected from the group consisting of ethylene oxide, propylene oxide and butylene oxides with cellulosic material in a proportion of about 40 to 4000 mols of alkylene oxide per glucose unit of the cellulosic material in the presence of at least one high molecular weight hydroxyl containing polyoxyalkylene compound.

2. The polyoxyalkylene condensates of cellulose comprising the reaction product of at least one alkylene oxide selected from the group consisting of ethylene oxide, propylene oxide and butylene oxides with cellulosic material in a proportion of from about 40 to 4000 mols of alkylene oxide per glucose unit of the cellulosic material, in the presence of alkali, and at least one high molecular weight hydroxyl containing polyoxyalkylene compound.

3. The polyoxyalkylene condensates of cellulose comprising the reaction product of at least one alkylene oxide selected from the group consisting of ethylene oxide, propylene oxide and butylene oxides with cellulosic material in a proportion of from about 40 to 4000 mols of alkylene oxide per glucose unit of the cellulosic material in the presence of alkali, and at least one hydroxyl containing polyoxyalkylene compound having a molecular weight of about 1000 to 100,000 per hydroxyl group at a temperature ranging from about 25 to 200° C., and a pressure ranging from about 0 to 500 p.s.i.g.

4. A method for the preparation of polyoxyalkylene condensates of cellulose comprising reacting at least one alkylene oxide selected from the group consisting of ethylene oxide, propylene oxide and butylene oxides with cellulosic material in the presence of at least one high molecular weight hydroxyl containing polyoxyalkylene compound at a temperature ranging from about 25 to 200° C. and a pressure ranging from about 0 to 500 p.s.i.g.

5. A method for the preparation of polyoxyalkylene condensates of cellulose comprising the steps of mixing cellulosic material with alkali, and at least one hydroxyl containing polyoxyalkylene compound having a molecular weight of about 1000 to 100,000 per hydroxyl group and reacting at least one alkylene oxide selected from the group consisting of ethylene oxide, propylene oxide and butylene oxides with said cellulosic material in a proportion of from about 40 to 4000 mols of alkylene oxide per glucose unit of the cellulosic material in the presence of said alkali, and hydroxyl containing polyoxyalkylene compound at a temperature ranging from about 25 to 200° C. and a pressure ranging from about 0 to 500 p.s.i.g.

6. The method of claim 5 wherein alkylene oxide is reacted with cellulosic material in a plurality of succeeding stepwise additions.

7. The method of claim 5 wherein said hydroxyl containing polyoxyalkylene compound is a polyoxypropylene glycol.

8. The method of claim 5 wherein said hydroxyl containing polyoxyalkylene compound is a derivative of 1,2-butylene oxide and trimethylolpropane.

9. The method of claim 5 wherein said hydroxyl containing polyoxyalkylene compound is a propylene oxide condensate with pentaerythritol.

10. The method of claim 5 wherein said hydroxyl containing polyoxyalkylene compound is a propylene oxide condensate with anhydroenneaheptitol.

11. The method of claim 5 wherein said cellulosic material is reacted with proylene oxide and ethylene oxide.

12. The method of claim 5 wherein said alkylene oxide is propylene oxide.

13. The method of claim 5 wherein said alkylene oxide is a butylene oxide.

14. A method for the preparation of polyoxyalkylene condensates of cellulose comprising the steps of mixing from about 5 to 25% by weight of cellulosic material, about 1 to 20% by weight of alkali metal hydroxide, about 75 to 25% by weight of at least one hydroxyl containing polyoxyalkylene compound having a molecular weight of about 1000 to 100,000 per hydroxyl group and sufficient water to make up the balance of the mixture and reacting at least one alkylene oxide selected from the group consisting of ethylene oxide, propylene oxide and butylene oxides with said cellulosic material in a proportion of from about 40 to 4000 mols of alkylene oxide per glucose unit of the cellulosic material in the presence of said alkali, water and hydroxyl containing polyoxyalkylene compound at a temperature ranging from about 25 to 200° C. and a pressure ranging from about 0 to 500 p.s.i.g.

15. The method for the preparation of polyoxylakylene condensates of cellulose comprising the steps of mixing from about 5 to 25% by weight of cellulosic material, about 1 to 20% by weight of alkali metal hydroxide, about 75 to 25% by weight of at least one hydroxyl containing polyoxyalkylene compound having a molecular weight of about 1000 to 100,000 per hydroxyl group and sufficient water to make up the balance of the mixture and reacting at least one alkylene oxide selected from the group consisting of ethylene oxide, propylene oxide and butylene oxides with said cellulosic material in a proportion of from about 40 to 4000 mols alkylene oxide per glucose unit of the cellulosic material in the presence of said alkali, water and hydroxyl containing polyoxyalkylene compound at a temperature ranging from about 25 to 200° C. and a pressure ranging from about 0 to 500 p.s.i.g.

References Cited

UNITED STATES PATENTS

| | | | |
|---|---|---|---|
| 2,173,470 | 12/1937 | Broderick | 260—231 |
| 2,572,039 | 10/1951 | Klug et al. | 260—231 |
| 2,839,419 | 6/1958 | Windover | 106—188 |
| 3,036,020 | 5/1962 | Britain | 260—2.5 |
| 3,036,022 | 5/1962 | Stewart et al. | 260—2.5 |
| 3,131,176 | 4/1964 | Klug | 260—231 |
| 3,131,177 | 4/1964 | Klug | 260—231 |
| 3,165,508 | 1/1965 | Otey et al. | 260—233.3 |
| 3,255,126 | 6/1966 | Fuzesi et al. | 260—2.5 |
| 3,277,213 | 10/1966 | Fuzesi | 260—2.5 |

DONALD E. CZAJA, *Primary Examiner.*

LEON J. BERCOVITZ, *Examiner.*

R. W. MULCAHY, *Assistant Examiner.*